US012068829B2

United States Patent
Ebadi Shahrivar et al.

(10) Patent No.: US 12,068,829 B2
(45) Date of Patent: Aug. 20, 2024

(54) RECEIVE DIVERSITY TECHNIQUES IN WIRELESS COMMUNICATIONS

(71) Applicant: QUALCOMM Incorporated, San Diego, CA (US)

(72) Inventors: Arash Ebadi Shahrivar, San Diego, CA (US); Peter Pui Lok Ang, San Diego, CA (US); Chinmay Shankar Vaze, San Diego, CA (US); Brian Clarke Banister, San Diego, CA (US); Raghu Narayan Challa, San Diego, CA (US); Alexei Yurievitch Gorokhov, San Diego, CA (US); Aamod Khandekar, San Diego, CA (US); Chun-Hao Hsu, San Jose, CA (US); Gautham Hariharan, Sunnyvale, CA (US); Ambarish Tripathi, San Diego, CA (US); Shailesh Maheshwari, San Diego, CA (US); Sivaguru Narasareddy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 17/949,044

(22) Filed: Sep. 20, 2022

(65) Prior Publication Data
US 2023/0098652 A1    Mar. 30, 2023

Related U.S. Application Data

(60) Provisional application No. 63/247,953, filed on Sep. 24, 2021.

(51) Int. Cl.
*H04B 7/08*    (2006.01)

(52) U.S. Cl.
CPC ..................................... *H04B 7/08* (2013.01)

(58) Field of Classification Search
CPC ... H04B 7/08; H04W 88/02; H04W 36/00692
See application file for complete search history.

(56) References Cited

U.S. PATENT DOCUMENTS

| 9,191,037 B2 * | 11/2015 | Lascari | ..................... H04B 1/14 |
| 11,419,054 B2 * | 8/2022 | Han | .................. H04W 52/0251 |

(Continued)

OTHER PUBLICATIONS

International Search Report and Written Opinion—PCT/US2022/044422—ISA/EPO—Dec. 21, 2022.

*Primary Examiner* — Dac V Ha
(74) *Attorney, Agent, or Firm* — Dalei Dong; Holland & Hart LLP

(57) ABSTRACT

Methods, systems, and devices for wireless communications are described that provide for receive chain selection at a user equipment (UE) with efficient switching between a reduced number of receive chains and an increased number of receive chains for downlink communications based on conditions at the UE. A UE may adaptively adjust the number of active receive chains based on downlink grant activity, channel conditions, network parameters, or any combinations thereof. An estimator block at the UE may determine to adjust the number of receive chains based on a number of downlink grants within one or more time periods. In some cases, grants for an amount of data that exceeds a threshold may be qualified in order to be counted at the estimation block. Further, a transient state may be provided where the UE may maintain a higher number of active receive chains until UE feedback is provided.

30 Claims, 10 Drawing Sheets

(56) References Cited

U.S. PATENT DOCUMENTS

| | | | |
|---|---|---|---|
| 11,716,705 B2* | 8/2023 | Fujishiro | H04W 68/04 |
| | | | 455/458 |
| 2013/0288624 A1 | 10/2013 | Mujtaba et al. | |
| 2014/0098694 A1 | 4/2014 | Damji et al. | |
| 2017/0324458 A1 | 11/2017 | Liu et al. | |
| 2021/0126684 A1* | 4/2021 | Chen | H04B 7/0456 |

* cited by examiner

RECEIVE DIVERSITY TECHNIQUES IN WIRELESS COMMUNICATIONS

CROSS REFERENCE

The present Application for Patent claims the benefit of U.S. Provisional Patent Application No. 63/247,953 by EBADI SHAHRIVAR et al., entitled "RECEIVE DIVERSITY TECHNIQUES IN WIRELESS COMMUNICATIONS," filed Sep. 24, 2021, assigned to the assignee hereof, and expressly incorporated by reference herein.

FIELD OF TECHNOLOGY

The following relates to wireless communications, including receive diversity techniques in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes or access network entities, each simultaneously supporting communication for multiple communication devices, which may be otherwise known as user equipment (UE). In some wireless communications systems, a UE may communicate with a base station using uplink and downlink communications, in which different antennas and associated components (e.g., amplifiers, phase shifters, etc.) of multiple transmit/receive chains may be used for uplink transmissions and for downlink receptions. In such systems, usage of multiple transmit/receive chains allows for increased communications bandwidth, and also consumes additional power.

SUMMARY

The described techniques relate to improved methods, systems, devices, and apparatuses that support receive diversity techniques in wireless communications. In accordance with various aspects, the described techniques provide for receive chain selection at a user equipment (UE) with efficient switching between a reduced number of receive chains and an increased number of receive chains for downlink communications based on conditions at the UE. In some cases, a UE may adaptively adjust the number of active receive chains based on downlink grant activity, channel conditions, network parameters, or any combinations thereof. In some cases, the switching the number of downlink receive chains may be performed after UE feedback corresponding to an updated number of downlink receive chains is provided by the UE. In some cases, a high activity estimator block and low activity estimator block may determine to adjust the number of receive chains. The high activity estimator block, in some cases, may track a number of downlink grants within a high activity time period and, if the number of downlink grants exceeds a first threshold, a number of receive chains may be increased. The low activity estimator block, in some cases, may track the number of grants within a low activity time period and, if the number of downlink grants is below a second threshold, the number of receive chains may be decreased. In some cases, the high activity time period may be shorter than the low activity time period, and/or the first threshold may be higher than the second threshold. In some cases, grants may be qualified in order to be counted at an estimation block, where a qualified grant is for an amount of data that is over a grant threshold value. Further, in some cases, a transient state may be provided where the UE may maintain a higher number of active receive chains until UE feedback is provided, and active chains may be maintained at the higher number if an access network entity continues to schedule grants that need more receive chains than indicated by the UE feedback.

A method for wireless communication at a user equipment (UE) is described. The method may include communicating with an access network entity using a first set of downlink receive chains, switching to a second set of downlink receive chains based on a downlink grant activity, properties of one or more resource grants received from the access network entity, and one or more of a channel parameter or a network parameter used for communications between the UE and the access network entity, and where a timing for the switching to the second set of downlink receive chains is relative to a UE feedback corresponding to the second set of downlink receive chains is provided by the UE.

An apparatus for wireless communication at a UE is described. The apparatus may include a processor, memory coupled with the processor, and instructions stored in the memory. The instructions may be executable by the processor to cause the apparatus to communicate with an access network entity using a first set of downlink receive chains, switch to a second set of downlink receive chains based on a downlink grant activity, properties of one or more resource grants received from the access network entity, and one or more of a channel parameter or a network parameter used for communications between the UE and the access network entity, and where a timing for the switching to the second set of downlink receive chains is relative to a UE feedback corresponding to the second set of downlink receive chains is provided by the UE.

Another apparatus for wireless communication at a UE is described. The apparatus may include means for communicating with an access network entity using a first set of downlink receive chains, means for switching to a second set of downlink receive chains based on a downlink grant activity, properties of one or more resource grants received from the access network entity, and one or more of a channel parameter or a network parameter used for communications between the UE and the access network entity, and where a timing for the switching to the second set of downlink receive chains is relative to a UE feedback corresponding to the second set of downlink receive chains is provided by the UE.

A non-transitory computer-readable medium storing code for wireless communication at a UE is described. The code may include instructions executable by a processor to communicate with an access network entity using a first set of downlink receive chains, switch to a second set of downlink receive chains based on a downlink grant activity, properties of one or more resource grants received from the access network entity, and one or more of a channel parameter or a network parameter used for communications between the UE and the access network entity, and where a timing for the switching to the second set of downlink receive chains is relative to a UE feedback corresponding to the second set of downlink receive chains is provided by the UE.

Some examples of the method, apparatuses, and non-transitory computer-readable medium described herein may further include operations, features, means, or instructions for determining, based on one or more estimates of one or more estimation blocks, that the downlink grant activity indicates a change from a first number of downlink receive chains in the first set of downlink receive chains to a second number of downlink receive chains in the second set of downlink receive chains. In some examples of the method, apparatuses, and non-transitory computer-readable medium described herein, the one or more estimation blocks include: a high activity estimation block that indicates an increase in the first number of downlink receive chains is projected in order to support estimated downlink grants, and a low activity estimation block that indicates a decrease in the first number of downlink receive chains is projected in order to support the estimated downlink grants, and where the high activity estimation block and the low activity estimation block each estimate future downlink grants based on a number of downlink grants or downlink grant activity in an associated time window, and a high activity time window of the high activity estimation block is shorter than a low activity time window of the low activity estimation block.

Some examples of the method, apparatuses, and non-transitory computer-readable medium described herein may further include operations, features, means, or instructions for determining the timing for the switching to the second set of downlink receive chains based on whether the second set of downlink receive chains includes more or fewer receive chains than the first set of downlink receive chains. In some examples of the method, apparatuses, and non-transitory computer-readable medium described herein, the timing for the switching to the second set of downlink receive chains is after a time window following providing the UE feedback, when the second set of downlink receive chains includes fewer receive chains than the first set of downlink receive chains and the timing for the switching to the second set of downlink receive chains is independent of the UE feedback, when the second set of downlink receive chains includes more receive chains than the first set of downlink receive chains.

Some examples of the method, apparatuses, and non-transitory computer-readable medium described herein may further include operations, features, means, or instructions for determining whether to adjust a number of active downlink receive chains based on an amount of resource grants provided by the access network entity after the UE feedback is provided. In some examples of the method, apparatuses, and non-transitory computer-readable medium described herein, the determining whether to adjust the number of active downlink receive chains may include operations, features, means, or instructions for determining that at least a threshold number of resource grants allocate more transmission layers than the number of active downlink receive chains of the second set of downlink receive chains and increasing the number of active downlink receive chains of the second set of downlink receive chains. In some examples of the method, apparatuses, and non-transitory computer-readable medium described herein, the downlink grant activity may be based on a quantity of downlink grants received from the access network entity that have at least a threshold amount of data that may be to be transmitted.

In some examples of the method, apparatuses, and non-transitory computer-readable medium described herein, the channel parameter includes a spectral efficiency parameter that is estimated for each of the first set of downlink receive chains and the second set of downlink receive chains, and where the switching to the second set of downlink receive chains is responsive to a second spectral efficiency estimate of the second set of downlink receive chains being within a threshold value of a first spectral efficiency estimate of the first set of downlink receive chains. In some examples of the method, apparatuses, and non-transitory computer-readable medium described herein, the network parameter used for communications between the UE and the access network entity includes a grant arrival uniformity that indicates a scheduling rate of grants from the access network entity, and where a scheduling rate below a scheduling rate threshold is associated with a lower data threshold for counting a grant in the downlink grant activity, and the scheduling rate at or above the scheduling rate threshold is associated with a higher data threshold for counting the grant in the downlink grant activity.

In some examples of the method, apparatuses, and non-transitory computer-readable medium described herein, the network parameter used for communications between the UE and the access network entity includes one or more grant arrival patterns that indicate a scheduling rate of grants from the access network entity, and where a scheduling rate below a scheduling rate threshold is associated with a lower data threshold for counting a grant in the downlink grant activity, and the scheduling rate at or above the scheduling rate threshold is associated with a higher data threshold for counting the grant in the downlink grant activity. In some examples of the method, apparatuses, and non-transitory computer-readable medium described herein, the downlink grant activity includes one or more of a number of grants, an average size of grants, an intra-arrival time of grants, a uniformity in time of grant arrival, a number of recourse blocks allocated in each of the grants, a percentage of padding included with each of the grants, or any combinations thereof.

Some examples of the method, apparatuses, and non-transitory computer-readable medium described herein may further include operations, features, means, or instructions for estimating the downlink grant activity for one or more future time periods based on received downlink grants for a prior predetermined time period. In some examples of the method, apparatuses, and non-transitory computer-readable medium described herein, the channel parameter includes one or more of a signal to noise ratio (SNR), a channel quality indicator (CQI), a rank, a reference signal received power, or any combinations thereof. In some examples of the method, apparatuses, and non-transitory computer-readable medium described herein, the channel parameter includes a spectral efficiency estimate that may be determined based on a channel state feedback measurement or a channel capacity calculation based on a correlation between a number of antenna ports and spectral efficiency.

In some examples of the method, apparatuses, and non-transitory computer-readable medium described herein, the second set of downlink receive chains include fewer downlink receive chains than the first set of downlink receive chains, and may be selected based on the downlink grant activity meeting a low activity threshold. In some examples of the method, apparatuses, and non-transitory computer-readable medium described herein, the second set of downlink receive chains include more downlink receive chains than the first set of downlink receive chains, and may be selected based on the downlink grant activity meeting a high activity threshold. In some examples of the method, apparatuses, and non-transitory computer-readable medium described herein, the UE feedback associated with the second set of downlink receive chains may be provided using channel state feedback (CSF) with a channel quality indication (CQI). In some examples of the method, apparatuses, and non-transitory computer-readable medium described herein, the UE feedback associated with the second set of downlink receive chains may be provided using a sounding reference signal (SRS) transmission for antenna switching.

DETAILED DESCRIPTION

Figure 1:
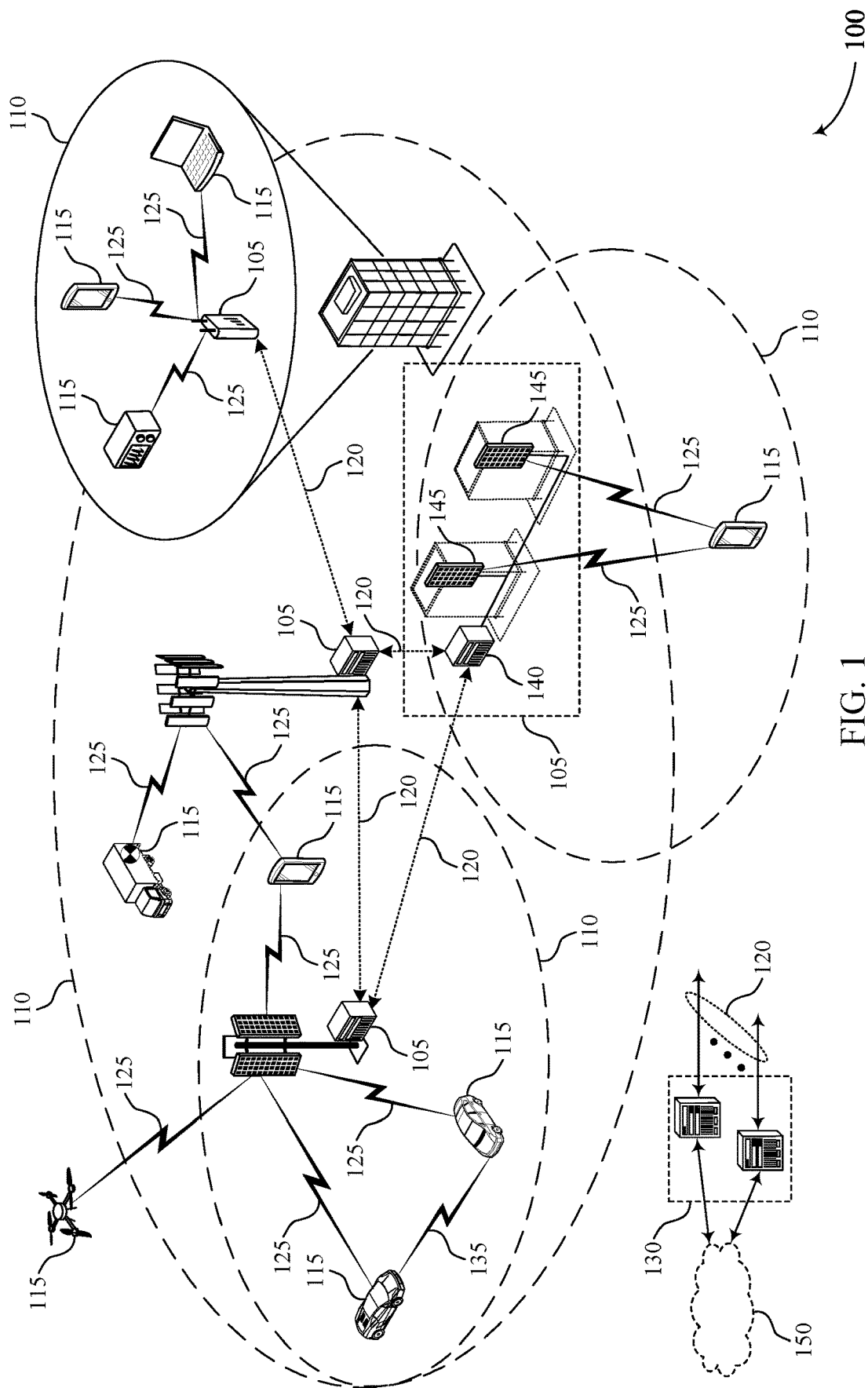
FIG. 1 illustrates an example of a wireless communications system that supports receive diversity techniques in wireless communications in accordance with aspects of the present disclosure.

In some wireless communications systems, a user equipment (UE) may communicate with a base station or an access network entity using multiple-input multiple-output (MIMO) communications in which multiple transmit chains and multiple receive chains may be used for uplink communications and downlink communications, respectively. In some cases, a UE may use more downlink receive chains than uplink transmit chains. Transmit chains and receive chains may include antenna elements and other related components, such as and amplifiers, filters, phase shifters, and the like. A number of downlink receive chains that are active at a UE depends on the UE performance requirements, and UE power consumption may be increased when more downlink receive chains are active. Thus, reducing the number of active downlink receive chains is desirable to conserve power. Various aspects of the present disclosure provide techniques to reduce the number of active downlink receive chains while also maintaining acceptable data transfer performance.

In accordance with various aspects, the techniques are described for receive chain selection at a UE with efficient switching between a reduced number of receive chains and an increased number of receive chains for downlink communications based on conditions at the UE. In some cases, a UE may adaptively adjust the number of active receive chains based on downlink grant activity, channel conditions (e.g., a signal-to-noise-ratio (SNR), channel quality indicator (CQI), rank, reference signal received power (RSRP), or any combinations thereof), network parameters (e.g., a bandwidth part (BWP) used for communications, a discontinuous reception (DRX) cycle configuration, or any combinations thereof), or any combinations thereof. In some cases, a high activity estimator block and low activity estimator block may be implemented at the UE. The high activity estimator block, in some cases, may track a number of downlink grants within a high activity time period and, if the number of downlink grants exceeds a first threshold, a number of receive chains may be increased. The low activity estimator block, in some cases, may track the number of grants within a low activity time period and, if the number of downlink grants is below a second threshold (which may be lower than the first threshold), the number of receive chains may be decreased. In some cases, the high activity time period may be shorter than the low activity time period in order to increase the number of downlink receive chains more quickly than reducing the number of receive chains. In some cases, grants may be qualified in order to be counted, where a qualified grant is for an amount of data that is over a grant threshold value (to avoid small grants skewing a decision). Further, in order to help avoid cases where the UE has an incorrect number of active chains, a transient state may be provided where the UE may maintain a higher number of active receive chains until UE feedback is provided, and active chains may be maintained at the higher number if the access network entity continues to schedule grants that need more receive chains than indicated by the UE feedback.

Techniques as discussed herein may thus provide for more efficient receive chain management for wireless communications. For example, implementation of receive chain management techniques at a UE may allow for an adaptive number of active receive chains based on conditions at the UE. Such techniques may thus enhance UE efficiency and reduce power consumption, which may help to increase battery life.

Aspects of the disclosure are initially described in the context of wireless communications systems. Examples of antenna modules and receive chain selection techniques are then described. Aspects of the disclosure are further illustrated by and described with reference to apparatus diagrams, system diagrams, and flowcharts that relate to receive diversity techniques in wireless communications.

FIG. 1 illustrates an example of a wireless communications system 100 that supports receive diversity techniques in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IOT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a carrier may support multiple cells, and different cells may be configured according to different protocol types (e.g., MTC, narrow band IoT (NB-IOT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system.

In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, a UE 115 may implement techniques as discussed herein to provide for efficient switching between a reduced number of receive chains and an increased number of receive chains for downlink communications based on conditions at the UE 115. In some cases, the UE 115 may adaptively adjust the number of active receive chains based on downlink grant activity, channel conditions, network parameters, or any combinations thereof.

Figure 2:
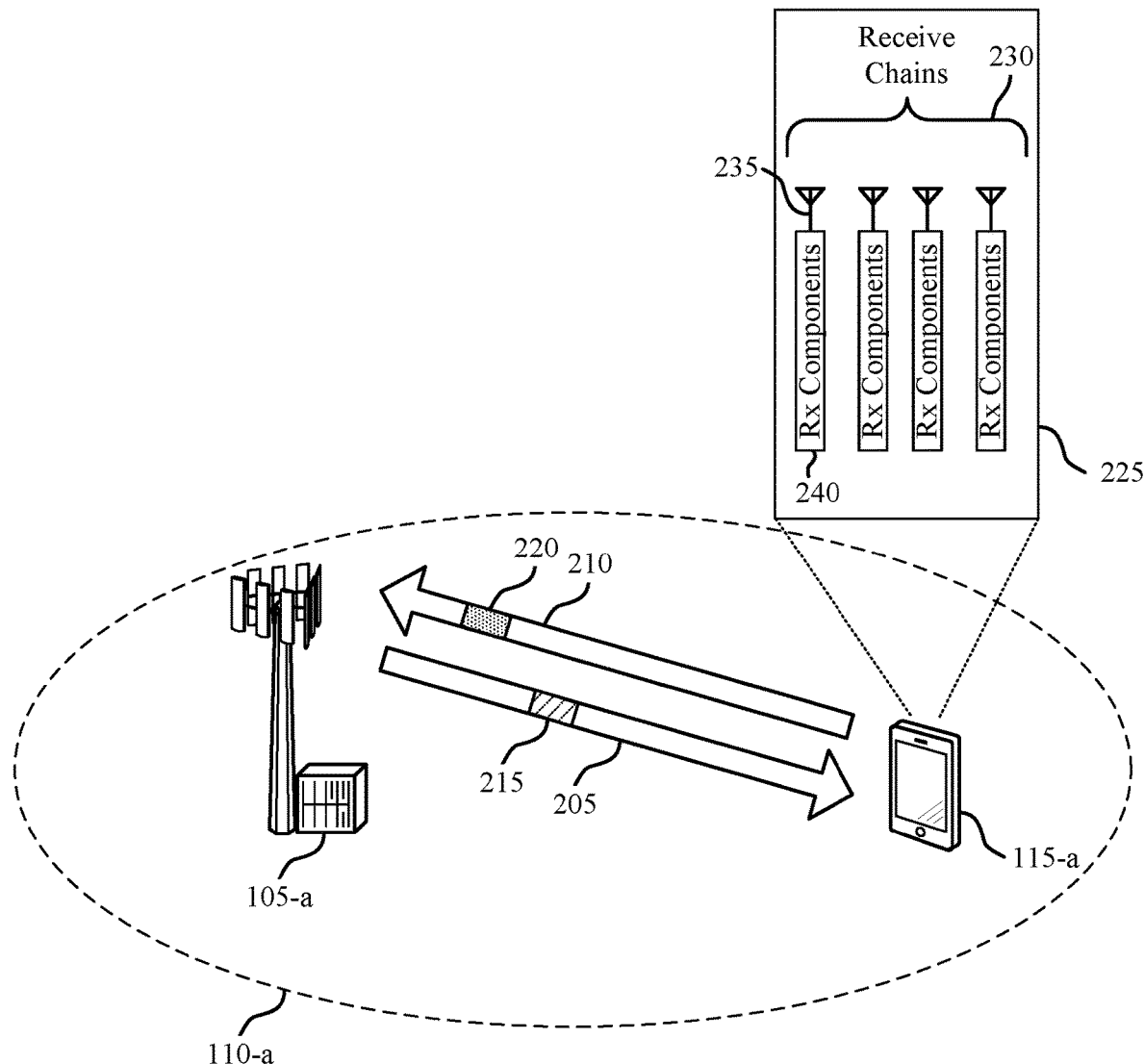
FIG. 2 illustrates an example of a portion of a wireless communications system that supports receive diversity techniques in wireless communications in accordance with aspects of the present disclosure.

FIG. 2 illustrates an example of a wireless communications system 200 that supports receive diversity techniques in wireless communications in accordance with aspects of the present disclosure. In the example of FIG. 2, wireless communications system 200 may include base station 105-a and UE 115-a, which may be examples of the corresponding devices described with respect to FIG. 1. Base station 105-a may provide network coverage for geographic coverage area 110-a. The base station 105-a may transmit downlink communications 205 to the UE 115-a, and the UE 115-a may transmit uplink communications 210 to the base station 105-a.

In some cases, the base station 105-a may transmit a number of resource grants 215 for downlink communications to the UE 115-a. To support downlink data rates for downlink communications, the UE 115-a may activate one or more receive chains 230 at one or more antenna modules 225. Each receive chain 230 may include an antenna element 235 and associated receive components 240 (e.g., amplifiers, filters, phase shifters, etc.). In accordance with various techniques discussed herein, the UE 115-a may determine a number of receive chains 230 that are activated. While one antenna module 225 with four receive chains 230 is illustrated in FIG. 2, other UEs may have more antenna modules, each of which may have more or fewer receive chains.

In some cases, UE 115-a may adaptively adjust the number of active receive chains 230 based on downlink grant activity, channel conditions, network parameters, or any combinations thereof. In some cases, an estimator block at the UE 115-a (e.g., which may include a high activity estimator block and low activity estimator block) may track a number of resource grants 215 within a time period and, if the number of resource grants 215 exceeds a first threshold, a number of active receive chains 230 may be increased, and if the number of resource grants 215 are below a second threshold, the number of active receive chains 230 may be decreased. In some cases, the first threshold may be a number of resource grants 215 within a high activity time period, and the second threshold may be a number of grants 215 within a low activity time period. In some cases, the high activity time period may be shorter than the low activity time period, the first threshold value may be higher than the second threshold value, or any combinations thereof, in order to increase the number of downlink receive chains 230 more quickly than reducing the number of receive chains 230. In some cases, grants may be qualified in order to be counted, where a qualified grant is for an amount of data that is over a threshold value (to avoid small grants skewing a decision). Further, in order to help avoid cases where the UE 115-a has an incorrect number of active receive chains 230, a transient state may be provided where the UE 115-a may maintain a higher number of active receive chains 230 until UE feedback 220 is provided, and the active receive chains 230 may be maintained at the higher number if the base station 105-a continues to schedule resource grants 215 that need more receive chains 230 than indicated by the UE feedback 220.

In some cases, the UE 115-a may initially set a number of active receive chains 230 based on a reported rank of the UE 115-a that is provided in UE feedback 220 (e.g., a channel state feedback (CSF) or sounding reference signal (SRS) feedback). The UE 115-a power consumption is determined, in part, by the number of active receive chains 230, and reducing a number of active receive chains 230 may help to reduce UE 115-a power consumption. Thus, by selecting a number of active receive chains 230 such that downlink throughput can be maintained while also having fewer than all receive chains active 230, UE 115-a power consumption may be reduced while maintaining good or acceptable overall performance.

In some cases, the UE 115-a may estimate upcoming expected resource grants 215 and determine the number of active receive chains 230 based on the estimate. In some cases, the estimate of the upcoming resource grants 215 may be based on a history of the received grants, their corresponding throughput, and their correlation with future grants. For example, if the UE 115-a receives several resource grants 215 in a specific duration the UE 115-a may determine (e.g., based on past behavior) that there is a high likelihood that the UE 115-a will receive more grants in the near future. Likewise, if the UE 115-a does not receive any grants in the specific duration the UE 115-a may determine (e.g., based on past behavior) that there is a high likelihood that the UE 115-a will not receive grants in the near future. The UE 115-a may use such determinations to adjust the number of active receive chains 230. In some cases, the UE 115-a may use artificial intelligence (AI) or machine learning (ML) to determine the likelihood of receiving resource grants 215 for one or more future time periods.

As discussed, in some cases changing the number of active receive chains 230 may be based on one or more estimator blocks. For example, the UE 115-a may use two estimator blocks (or filters) which determine whether to decrease or increase the number of active receive chains 230. In such cases, a high activity estimator block may track a number of grants within a time-up switch (TUS) period to determine if the UE 115-a is to increase the number of active receive chains 230, and a low activity estimator block may track a number of grants within a time-down switch (TDS) period to determine if the UE 115-a is to decrease the number of active receive chains 230.

In some cases, based on an up-switch indication or a down-switch indication from the estimator block(s). the UE 115-a may enter a transient state in which an existing number of active receive chains 230 is maintained until the base station 105-a has an opportunity to make a corresponding change in associated resource grants 215. For example, if the UE 115-a determines to reduce the number of active receive chains 230, the UE 115-a may maintain the same number of active receive chains 230 over specific time window (e.g., based on a timer value) and provide the UE feedback 220 (e.g., a channel state feedback (CSF) or sounding reference signal (SRS) feedback) for transmission to the base station 105-a (e.g., a physical layer at the UE 115-a may provide the UE feedback to a higher layer for transmission, and the time window may be selected to provide sufficient time for transmission of the UE feedback 220 and processing thereof at the base station 105-a). The UE 115-a, after the time window, may perform the actual reduction of number of active receive chains 230. In another example, the UE 115-a may determine to increase the number of active receive chains 230, and such a change may be implemented immediately, concurrently with providing the UE feedback 220, as there is not a performance penalty in downlink throughput for increasing number of active receive chains 230.

In some cases, the UE 115-a may detect a layer violation, in which the base station 105-a may not follow the reported UE feedback associated with a reduced number of receive chains 230. For example, resource grants 215 may provide downlink communications that need additional receive chains 230 to decode communications in accordance with target decoding timelines (e.g., a number of layers of a grant may exceed a number of active receive chains 230). In such cases, if the UE 115-a detects such a situation, the UE 115-a may increase the number of active receive chains 230 to accommodate the received resource grants 215.

In some cases, the UE 115-a may use grant qualification to determine if a resource grant 215 is to be used for adjustment of active receive chains 230. In such cases, in order to more accurately reduce or increase the number of receive chains 230, the UE 115-a may make switching determinations based on resource grants 215 with a relatively large amount of data (e.g., an amount of data that exceeds a data threshold value). For example, the data threshold value may be evaluated for resource grants 215 based on a grant transport block (TB) size, a number of allocated resource blocks (RBs) and amount of padding in each grant, or any combinations thereof. In some cases, grant criteria may be applied with specific thresholds for each metric (e.g., grant size, number of allocated RBs, and the like) to determine that the grant is qualified to be used as part of the receive chain adjustment procedure.

Additionally or alternatively, the UE 115-a may estimate spectral efficiency and use such an estimation to adjust a number or active receive chains 230. In some cases, the UE 115-a may estimate spectral efficiency values with different numbers of receive chains 230, and adjust a number of active receive chains 230 based on spectral efficiency differences. In some cases, the spectral efficiency may be determined using CSF, or using a channel capacity calculation incorporating correlation between antenna ports and spectral efficiency for different numbers of receive chains 230. In some cases, if significant spectral efficiency improvement can be achieved by adding one or more receive chains 230 to an already active number of receive chains 230, the UE 115-a may determine to add one or more receive chains 230. Similarly, if the UE 115-a is using M active receive chains 230, and a spectral efficiency of M+x receive chains is similar to a spectral efficiency of M+y receive chains, where x is greater than y, the UE 115-a may select M+y receive chains 230.

Further, in some case, adaptive threshold values may be implemented for determining active receive chains 230. For example, it may be advantageous to adjust thresholds for changing the number of receive chains 230 to provide adequate adjustments for different network loads and configurations, which may reduce or increase a scheduling rate of resource grants 215. In such cases, in order to tune the threshold values over the base station 105-a scheduling rate, a metric may be provided to indicate a grant arrival uniformity. Such a grant arrival uniformity metric may be used to adjust threshold values for changing the number of receive chains 230 (e.g., numbers of grants within a time period to increase or decrease active receive chains, time period durations for determining to increase or decrease receive chains, or combinations thereof). In some cases, for non-uniform grant arrivals, the base station 105-a scheduling rate may be low, and lower thresholds may be applied for the number of received resource grants 215 needed to increase number of receive chains 230. In some cases, for uniform grant arrivals, the base station 105-a scheduling rate may be high, and a higher threshold applied for the number of received resource grants 215 needed to increase number of receive chains 230. In some cases, one or more resource grants 215 may be filtered out from counts used for determining low and high activity conditions, such as based on throughput, percentage of padding, number of allocated resource blocks, transport block size, or any combinations thereof. Accordingly, in some cases, the adjustment to the number of active receive chains 230 may be based on grant activity of received resource grants 215, such as a number of grants, size of grants, grant interarrival time, grant arrival uniformity, number of RBs in each grant, percentage of padding of grants, or any combinations thereof. In some cases, the downlink resource grant 215 activity for one or more future time periods may be determined based on a traffic prediction method (e.g., a determined or configured algorithm executed by the UE 115-a that may implement AI or ML to enhance predictions).

As discussed above, in some cases, the UE 115-a may move to a transient state after determining to change a number of active receive chains 230. Such a transient state may provide that when the UE 115-a determined to change the number of active receive chains 230, a sufficient amount of time is provided to allow the base station 105-a to receive and process UE feedback 220 (e.g., CSF with CQI or SRS feedback for antenna switching), and adjust subsequent resource grants 215. In some cases, the UE 115-a may determine to adjust from M+x active receive chains 230 to M active receive chains 230, and the UE 115-a may enter the transient state in which the M+x receive chains 230 are kept active until a transient condition is met (e.g., a specific number of CSF reports, a time window is elapsed, or any combinations thereof). In some cases, the base station 105-a may configure a discontinuous reception (DRX) cycle, and extra conditions may be added to avoid adjusting the number of active receive chains 230 based on gaps that result from the DRX cycle. In some cases, the UE 115-a may remain in the transient state over several DRX cycles (e.g., depending on duration of DRX cycle).

Figure 3:
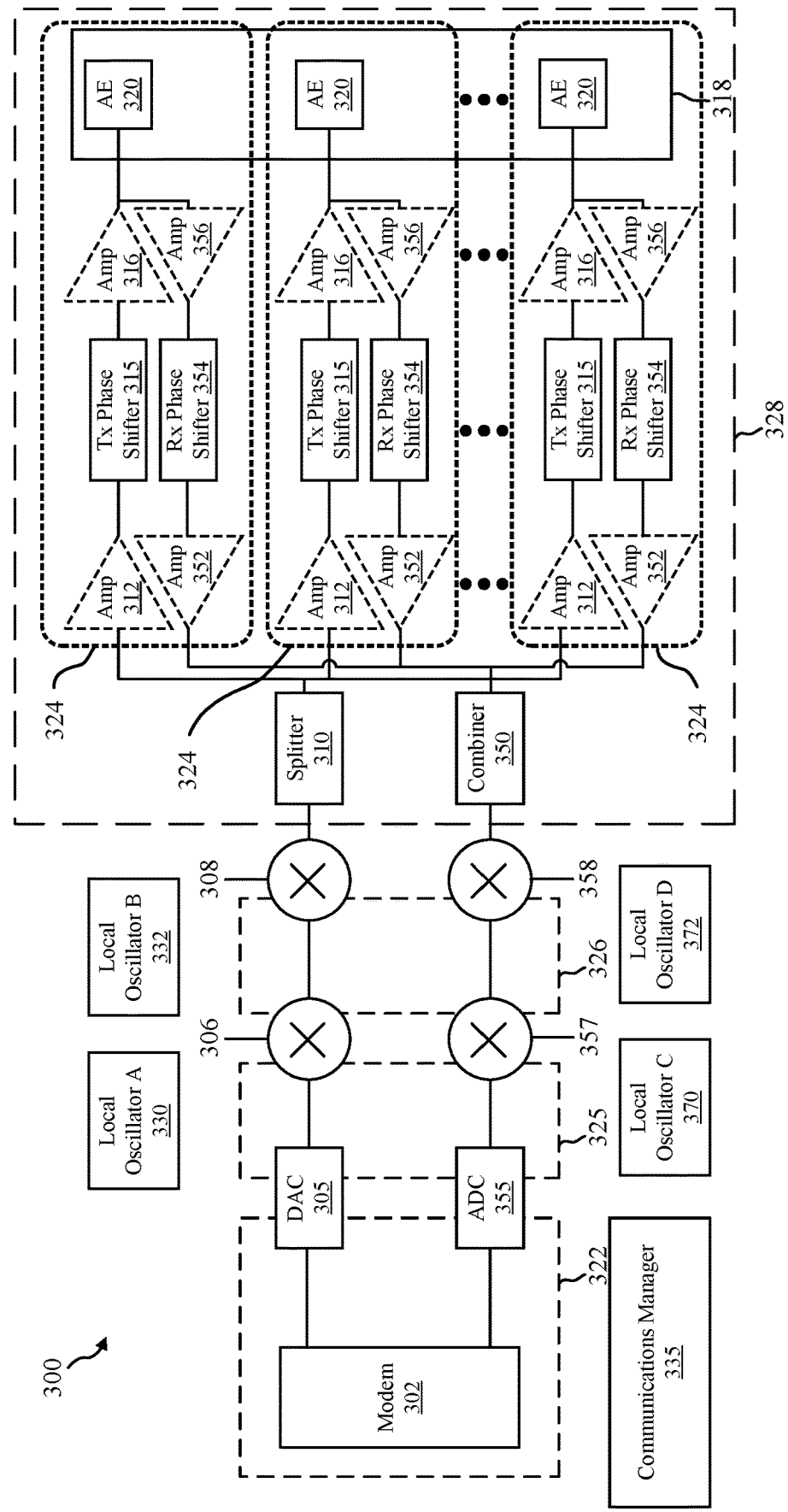
FIG. 3 illustrates an example of an antenna module that supports receive diversity techniques in wireless communications in accordance with aspects of the present disclosure.

FIG. 3 illustrates an example of an antenna module 300 that supports receive diversity techniques in wireless communications in accordance with aspects of the present disclosure. In some examples, antenna module 300 may implement aspects of wireless communications systems 100 or 200, as described with reference to FIGS. 1 and 2. In some examples, antenna module 300 may be an example of an antenna module 225 and include transceiver chains 324 that may be used to transmit and receive signals and may be examples of receive chains 230 of FIG. 2. In some examples, antenna module 300 may be incorporated in a transmitting device or a receiving device (e.g., a UE or a base station), as described herein.

Broadly, FIG. 3 is a diagram illustrating example hardware components of a wireless device in accordance with certain aspects of the disclosure. The illustrated components may include those that may be used for transceiver chain 324 selection where each transceiver chain 324 has an associated number of components that may be switched on and off based on whether the transceiver chain 324 is active or inactive. Further, some components illustrated in FIG. 3 (e.g., modem, communications manager, oscillators, etc.) may be shared with one or more other antenna modules that may be included in a transmitting device or a receiving device. It is noted that there are numerous architectures for antenna elements, receive chains, and associated components, only one example of which is illustrated here. The antenna module 300 includes a modem (modulator/demodulator) 302, a digital to analog converter (DAC) 305, a first mixer 306, a second mixer 308, and a splitter 310. Each transceiver chain 324 in this example, for transmitting signals, also includes first amplifier 312, a phase shifter 315, a second amplifier 316, and an antenna element 320 (e.g., that may be part of an antenna array 318 that includes a plurality of antenna elements 320). Transmission lines or other waveguides, wires, traces, or the like are shown connecting the various components to illustrate how signals to be transmitted may travel between components. Boxes 322, 325, 326, and 328 indicate regions in the antenna module 300 in which different types of signals travel or are processed. Specifically, box 322 indicates a region in which digital baseband signals travel or are processed, box 325 indicates a region in which analog baseband signals travel or are processed, box 326 indicates a region in which analog intermediate frequency (IF) signals travel or are processed, and box 328 indicates a region in which analog radio frequency (RF) signals travel or are processed. The architecture also includes a local oscillator A 330, a local oscillator B 332, and a communications manager 335.

Each of the antenna elements 320 may include one or more sub-elements (not shown) for radiating or receiving RF signals. For example, a single antenna element 320 may include a first sub-element cross-polarized with a second sub-element that can be used to independently transmit cross-polarized signals (e.g., in different ranks or layers). The antenna elements 320 may include patch antennas or other types of antennas arranged in a linear, two dimensional, or other pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control selection of transceiver chains 324 for downlink communications. In some cases, transceiver chains 324 used for downlink communications may include all or a subset of available transceiver chains 324, and a number of active transceiver chains 324 for downlink communications may be adjusted in accordance with techniques discussed herein. In some cases, fewer transceiver chains 324 are used for uplink than are used for downlink, although techniques as discussed herein, in some cases, may be used to adjust a number of uplink chains. In some cases, the modem 302 may control operation of the DAC 305, first and second mixers 306, 308, splitter 310, first amplifiers 312, phase shifters 315, and/or the second amplifiers 316 to transmit signals via the uplink chains (e.g., one or more or all of the antenna elements 320). The modem 302 may process signals and control operation in accordance with a communication standard such as a wireless standard discussed herein. The modem 302 or communications manager 335 (or communications manager 335 that is included in the modem 302) may also control adjustment of a number of transceiver chains 324 that are active for downlink communications in accordance with techniques as discussed herein.

The DAC 305 may convert digital baseband signals received from the modem 302 (and that are to be transmitted) into analog baseband signals. The first mixer 306 upconverts analog baseband signals to analog IF signals within an IF using a local oscillator A 330. The second mixer 308 upconverts the analog IF signals to analog RF signals using the local oscillator B 332. Similarly to the first mixer, the second mixer 308 may mix the signals with an oscillating signal generated by the local oscillator B 332 to "move" the IF analog signals to the RF, or the frequency at which signals will be transmitted or received. The modem 302 and/or the communications manager 335 may adjust the frequency of local oscillator A 330 and/or the local oscillator B 332 so that a desired IF and/or RF frequency is produced and used to facilitate processing and transmission of a signal within a desired bandwidth.

In the illustrated antenna module 300, signals upconverted by the second mixer 308 are split or duplicated into multiple signals by the splitter 310 based on which antenna elements 320) are activated. The splitter 310 in antenna module 300 splits the RF signal into a plurality of identical or nearly identical RF signals, as denoted by its presence in box 328. In other examples, the split may take place with any type of signal including with baseband digital, baseband analog, or IF analog signals. Each of these signals may correspond to an antenna element 320 and the signal travels through and is processed by amplifiers 312, 316, phase shifters 315, and/or other elements corresponding to the respective antenna element 320 to be provided to and transmitted by the corresponding antenna element 320 of the antenna array 318. After being split by the splitter 310, the resulting RF signals may enter an amplifier, such as a first amplifier 312, or a phase shifter 315 corresponding to an antenna element 320. The first and second amplifiers 312, 316 are illustrated with dashed lines because one or both of them might not be necessary in some implementations. The amplifiers 312, 316 may provide a desired level of positive or negative gain. Each of the amplifiers 312, 316 may be controlled independently (e.g., by the modem 302 or communications manager 335) to provide independent control of the gain for each antenna element 320. For example, the modem 302 and/or the communications manager 335 may have at least one control line connected to each of the splitter 310, first amplifiers 312, phase shifters 315, and/or second amplifiers 316 which may be used to configure a gain to provide a desired amount of gain for each component and thus each antenna element 320. The phase shifter 315 may provide a configurable phase shift or phase offset to a corresponding RF signal to be transmitted. The modem 302 and/or the communications manager 335 may have at least one control line connected to each of the phase shifters 315 and which may be used to configure the phase shifters 315 to provide a desired amounts of phase shift or phase offset between antenna elements 320.

In the illustrated antenna module 300, RF signals received by the transceiver chains 324 may be received at antenna elements 320 and provided to one or more of first amplifier 356 to boost the signal strength. In some cases, transceiver chains 324 used for downlink may include all or a subset of available transceiver chains 324, which may be adjusted in accordance with techniques discussed herein. The boosted RF signal is input into one or more of phase shifter 354 to provide a configurable phase shift or phase offset for the corresponding received RF signal. The modem 302 and/or the communications manager 335 may have at least one control line connected to each of the phase shifters 354 and which may be used to configure the phase shifters 354 to provide a desired amount of phase shift or phase offset between antenna elements 320. The outputs of the phase shifters 354 may be input to one or more second amplifiers 352 for signal amplification of the phase shifted received RF signals. The second amplifiers 352 may be individually configured to provide an amount of gain to ensure that the signal input to combiner 350 have the same magnitude. The amplifiers 352 and/or 356 are illustrated in dashed lines because they might not be necessary in some implementations.

The combiner 350 in this exemplary architecture combines the RF signal into a signal, as denoted by its presence in box 328. The output of the combiner 350 is input into mixers 358 and 357. Mixers 358 and 357 generally down convert the received RF signal using inputs from local oscillator C 370 and local oscillator D 372, respectively, to create intermediate or baseband signals that carry the encoded and modulated information. The output of the mixers 358 and 357 are input into an analog-to-digital converter (ADC) 355 for conversion to analog signals. The analog signals output from ADC 355 is input to modem 302 for baseband processing, e.g., decoding, de-interleaving, etc.

The antenna module 300 is given by way of example only to illustrate an architecture for transmitting and/or receiving signals in which active receive chains (e.g., active transceiver chains 324 used for receiving communications) may be adjusted as discussed herein. It will be understood that the antenna module 300 and/or each portion of the antenna module 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included each with one or more of their own corresponding amplifiers, phase shifters, splitters, mixers, DACs, ADCs, and/or modems. For example, a single UE may include two, four or more antenna panels or virtual antenna panels for transmitting or receiving signals at different physical locations on the UE or in different directions. Furthermore, mixers, splitters, amplifiers, phase shifters and other components may be located in different signal type areas (e.g., different ones of the boxes 322, 325, 326, 328) in different implemented architectures. For example, a split of the signal to be transmitted into a plurality of signals may take place at the analog RF, analog IF, analog baseband, or digital baseband frequencies in different examples. Similarly, amplification, and/or phase shifts may also take place at different frequencies. For example, in some contemplated implementations, one or more of the combiner 350, amplifiers 352, 356, or phase shifters 354 may be located between the ADC 355 and the first mixer 357 or between the first mixer 357 and the second mixer 358. In one example, the functions of one or more of the components may be combined into one component. For example, the phase shifters 354 may perform amplification to include or replace the first and/or or second amplifiers 352, 356. By way of another example, a phase shift may be implemented by the second mixer 358 to obviate the need for a separate phase shifter 354. This technique is sometimes called local oscillator (LO) phase shifting. In one implementation of this configuration, there may be a plurality of IF to RF mixers (e.g., for each antenna element chain) within the second mixer 358 and the local oscillator D 372 would supply different local oscillator signals (with different phase offsets) to each IF to RF mixer.

The modem 302 and/or the communications manager 335 may control one or more of the other components 305-372 to use and adjust a number of active receive chains for downlink communications, as discussed herein. For example, the transceiver chains 324 may be activated or deactivated for downlink communications for reception of a signal (or signals) by controlling whether associated components are enabled.

Figure 4:
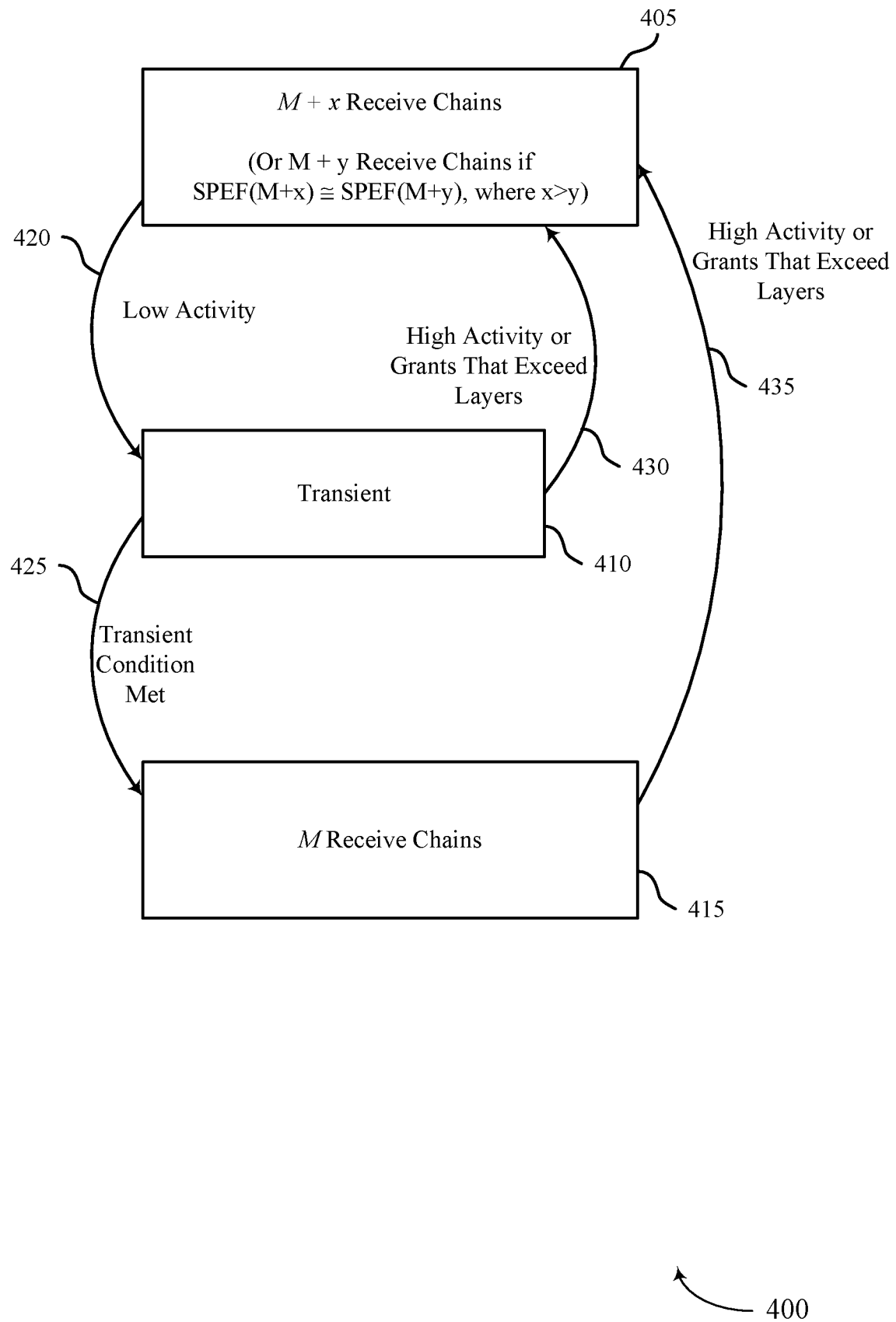
FIG. 4 illustrates an example of a state diagram that supports receive diversity techniques in wireless communications in accordance with aspects of the present disclosure.

FIG. 4 illustrates an example of a state diagram 400 that supports receive diversity techniques in wireless communications in accordance with aspects of the present disclosure. The state diagram 400 may be implemented by a UE or its components as described herein. For example, the state diagram 400 may be used by a UE 115 as described with reference to FIGS. 1 and 2, or may be performed by a modem 302 and/or communications manager 335 of FIG. 3. In some examples, a UE or associated components may execute a set of instructions to control the functional elements of the UE to perform the described functions. Additionally or alternatively, the UE may perform aspects of the described functions using special-purpose hardware. Operations shown and discussed in the example of FIG. 4 may be performed in a different order than the described examples, or the operations performed may be performed in different orders or at different times than in the described examples.

In this example, at 405, the UE may be active with a first number of active receive chains, indicated in the example of FIG. 4 as M+x receive chains. For example, the UE may establish a connection with a base station (e.g., using RRC connection establishment procedures), and initially activate all available receive chains for communications with the base station. As discussed herein, in some cases, the UE may move to a transient state 410 after determining to change a number of active receive chains. For example, an estimation block (e.g., a low activity estimation block) may indicate low activity for downlink resource grants that causes the UE to switch to a lower number of active receive chains, and at 420 the UE may transition to the transient state. Such a transient state 410 may provide that when the UE determines to change the number of active receive chains, a sufficient amount of time is provided to allow a serving base station to receive and process UE feedback (e.g., CSF with CQI or SRS feedback for antenna switching), and adjust subsequent resource grants. In some cases, the UE may determine to adjust from M+x active receive chains to state with M active receive chains, as indicated at 415, and the UE may enter the transient state 410 in which the M+x receive chains are kept active until a transient condition is met at 425 (e.g., a specific number of CSF reports, a time window is elapsed, or any combinations thereof).

When adding active receive chains, at 435, the UE may transition from M receive chains to M+x receive chains after identification (e.g., at a high activity estimation block) that one or more high activity thresholds have been met, or that one or more received resource grants are received that use more layers than are supported by currently active receive chains. In this example, the UE transitions directly to the state with additional active receive chains at 405 (e.g., before or after providing feedback), due to no degradation in decoding performance when adding active receive chains. Further, in this example, if while in the transient state 410, the high activity threshold(s) are met or grants that exceed layers supported by active receive chains are present, the UE may transition to the M+x receive chains state as indicated at 430. Additionally, as discussed herein, in some cases the UE may estimate spectral efficiency for different numbers of active receive chains, and if M+y receive chains provide approximately equivalent spectral efficiency (e.g., within 10%) the M+y receive chains may be selected rather than M+x receive chains (where x>y).

Figure 5:
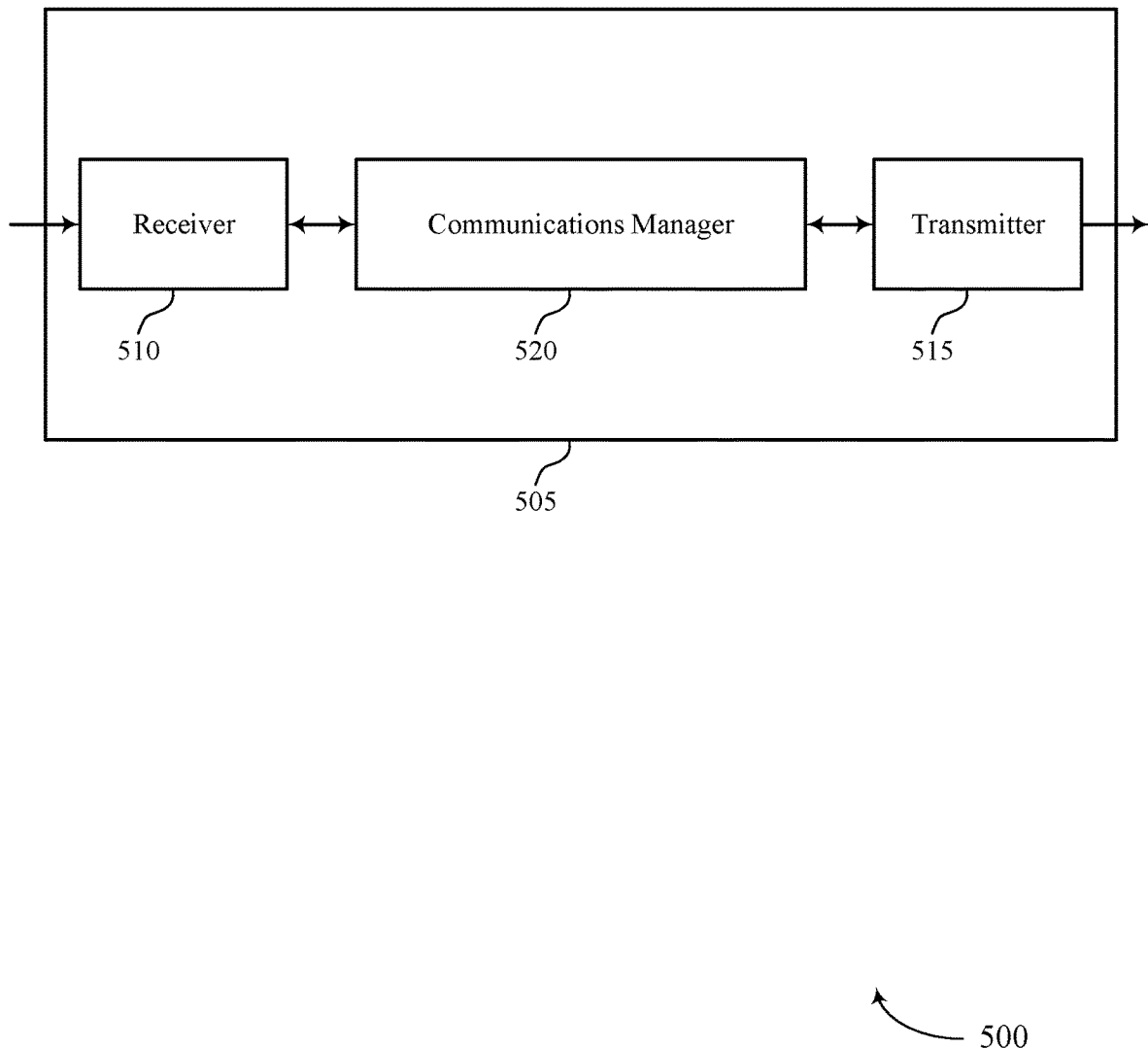
FIGS. 5 and 6 show block diagrams of devices that support receive diversity techniques in wireless communications in accordance with aspects of the present disclosure.

FIG. 5 shows a block diagram 500 of a device 505 that supports receive diversity techniques in wireless communications in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to receive diversity techniques in wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to receive diversity techniques in wireless communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of receive diversity techniques in wireless communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for communicating with an access network entity using a first set of downlink receive chains. The communications manager 520 may be configured as or otherwise support a means for switching to a second set of downlink receive chains based on a downlink grant activity, properties of one or more resource grants received from the access network entity, and one or more of a channel parameter or a network parameter used for communications between the UE and the access network entity. The communications manager 520 may be configured as or otherwise support a means for switching to the second set of downlink receiving chains based on a timing relative to a UE feedback corresponding to the second set of downlink receive chains is provided by the UE.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for adaptive adjustment of a number of active receive chains based on conditions at the UE. Such techniques may thus enhance UE efficiency and reduce power consumption, which may help to increase battery life.

Figure 6:
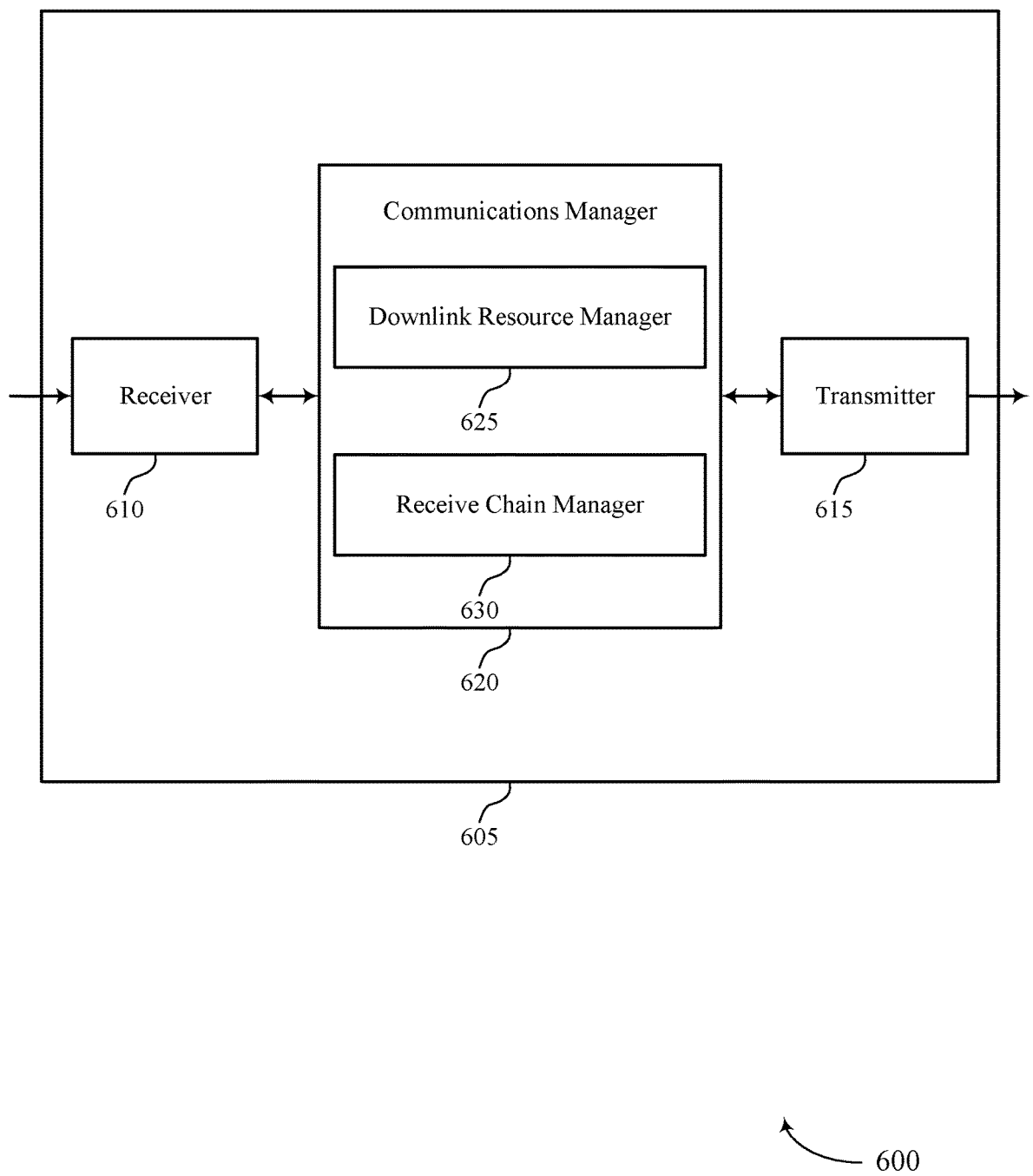

FIG. 6 shows a block diagram 600 of a device 605 that supports receive diversity techniques in wireless communications in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to receive diversity techniques in wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to receive diversity techniques in wireless communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of receive diversity techniques in wireless communications as described herein. For example, the communications manager 620 may include a downlink resource manager 625 a receive chain manager 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The downlink resource manager 625 may be configured as or otherwise support a means for communicating with an access network entity using a first set of downlink receive chains. The receive chain manager 630 may be configured as or otherwise support a means for switching to a second set of downlink receive chains based on a downlink grant activity, properties of one or more resource grants received from the access network entity, and one or more of a channel parameter or a network parameter used for communications between the UE and the access network entity. The receive chain manager 630 may be configured as or otherwise support a means for switching to the second set of downlink receive chains based on a timing relative to a UE feedback corresponding to the second set of downlink receive chains is provided by the UE.

Figure 7:
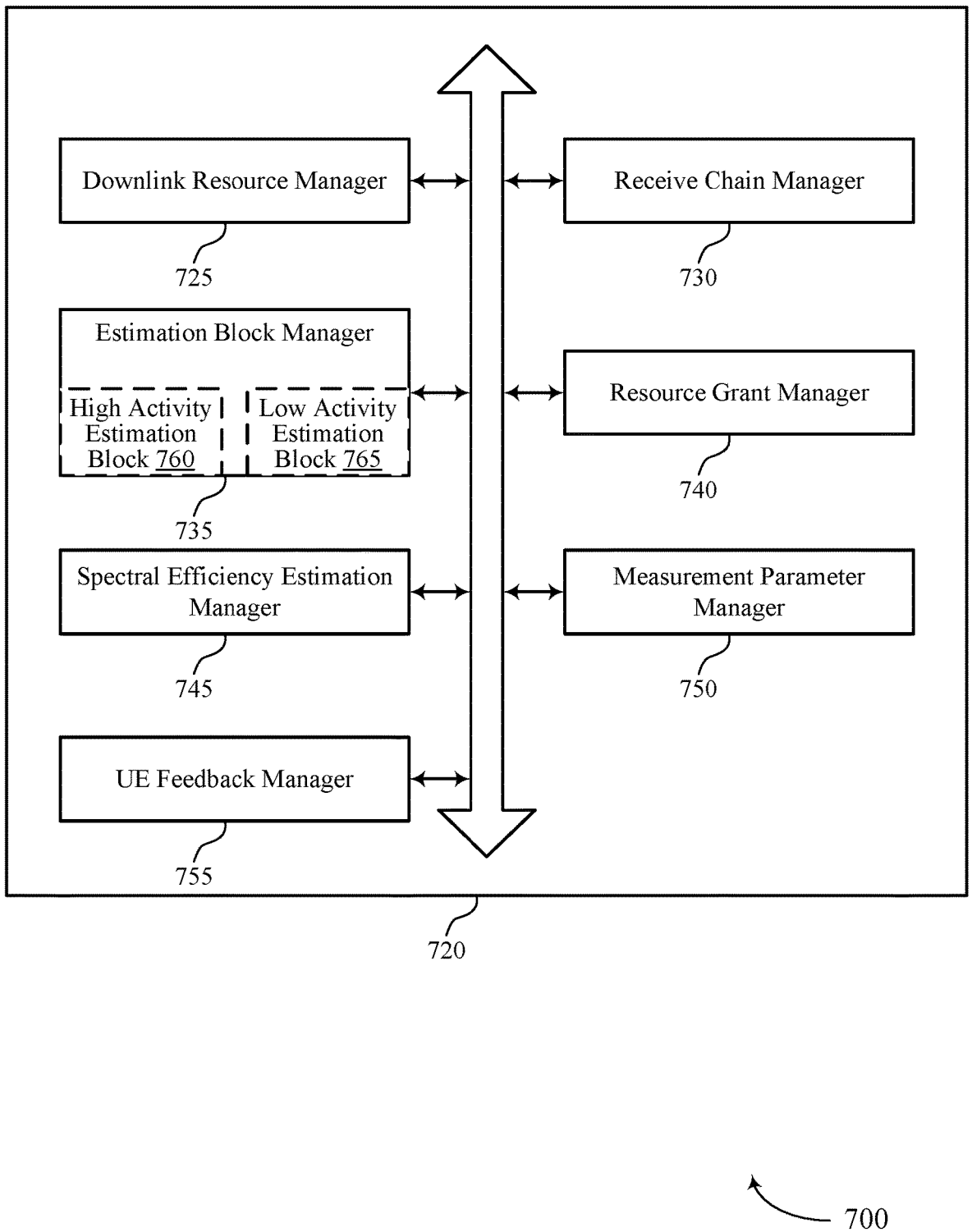
FIG. 7 shows a block diagram of a communications manager that supports receive diversity techniques in wireless communications in accordance with aspects of the present disclosure.

FIG. 7 shows a block diagram 700 of a communications manager 720 that supports receive diversity techniques in wireless communications in accordance with aspects of the present disclosure. The communications manager 720 may be an example of aspects of a communications manager 520, a communications manager 620, or both, as described herein. The communications manager 720, or various components thereof, may be an example of means for performing various aspects of receive diversity techniques in wireless communications as described herein. For example, the communications manager 720 may include a downlink resource manager 725, a receive chain manager 730, an estimation block manager 735 with optional a high activity estimation block 760 and a low activity estimation block 765, a resource grant manager 740, a spectral efficiency estimation manager 745, a measurement parameter manager 750, a UE feedback manager 755, or any combination thereof. Each of these components may communicate, directly or indirectly, with one another (e.g., via one or more buses).

The communications manager 720 may support wireless communication at a UE in accordance with examples as disclosed herein. The downlink resource manager 725 may be configured as or otherwise support a means for communicating with an access network entity using a first set of downlink receive chains. The receive chain manager 730 may be configured as or otherwise support a means for switching to a second set of downlink receive chains based on a downlink grant activity, properties of one or more resource grants received from the access network entity, and one or more of a channel parameter or a network parameter used for communications between the UE and the access network entity. In some examples, the receive chain manager 730 may be configured as or otherwise support a means for switching to the second set of downlink receive chains based on a timing relative to a UE feedback corresponding to the second set of downlink receive chains is provided by the UE.

In some examples, the estimation block manager 735 may be configured as or otherwise support a means for determining, based on one or more estimates of one or more estimation blocks, that the downlink grant activity indicates a change from a first number of downlink receive chains in the first set of downlink receive chains to a second number of downlink receive chains in the second set of downlink receive chains.

In some examples, a high activity estimation block 760 may indicate an increase in the first number of downlink receive chains is projected in order to support estimated downlink grants. In some examples, a low activity estimation block 765 may indicate a decrease in the first number of downlink receive chains is projected in order to support the estimated downlink grants. In some examples, the high activity estimation block 760 and the low activity estimation block 765 each estimate future downlink grants based on a number of downlink grants or downlink grant activity in an associated time window, and a high activity time window of the high activity estimation block 760 is shorter than a low activity time window of the low activity estimation block 765.

In some examples, the receive chain manager 730 may be configured as or otherwise support a means for determining the timing for the switching to the second set of downlink receive chains based on whether the second set of downlink receive chains includes more or fewer receive chains than the first set of downlink receive chains. In some examples, the timing for the switching to the second set of downlink receive chains is after a time window following providing the UE feedback, when the second set of downlink receive chains includes fewer receive chains than the first set of downlink receive chains. In some examples, the timing for the switching to the second set of downlink receive chains is independent of the UE feedback (e.g., immediately following transmission of the feedback), when the second set of downlink receive chains includes more receive chains than the first set of downlink receive chains.

In some examples, the resource grant manager 740 may be configured as or otherwise support a means for determining whether to adjust a number of active downlink receive chains based on an amount of resource grants provided by the access network entity after the UE feedback is provided. In some examples, to support determining whether to adjust the number of active downlink receive chains, the resource grant manager 740 may be configured as or otherwise support a means for determining that at least a threshold number of resource grants allocate more transmission layers than the number of active downlink receive chains of the second set of downlink receive chains. In some examples, to support determining whether to adjust the number of active downlink receive chains, the resource grant manager 740 may be configured as or otherwise support a means for increasing the number of active downlink receive chains of the second set of downlink receive chains.

In some examples, the downlink grant activity is based on a quantity of downlink grants received from the access network entity that have at least a threshold amount of data that is to be transmitted. In some examples, the channel parameter includes a spectral efficiency parameter that is estimated for each of the first set of downlink receive chains and the second set of downlink receive chains, and where the switching to the second set of downlink receive chains is responsive to a second spectral efficiency estimate of the second set of downlink receive chains being within a threshold value of a first spectral efficiency estimate of the first set of downlink receive chains.

In some examples, the network parameter used for communications between the UE and the access network entity includes a grant arrival uniformity that indicates a scheduling rate of grants from the access network entity, and where a scheduling rate below a scheduling rate threshold is associated with a lower data threshold for counting a grant in the downlink grant activity, and the scheduling rate at or above the scheduling rate threshold is associated with a higher data threshold for counting the grant in the downlink grant activity. In some examples, the network parameter used for communications between the UE and the access network entity includes one or more grant arrival patterns that indicate a scheduling rate of grants from the access network entity, and where a scheduling rate below a scheduling rate threshold is associated with a lower data threshold for counting a grant in the downlink grant activity, and the scheduling rate at or above the scheduling rate threshold is associated with a higher data threshold for counting the grant in the downlink grant activity. In some examples, the downlink grant activity includes one or more of a number of grants, an average size of grants, an intra-arrival time of grants, a uniformity in time of grant arrival, a number of recourse blocks allocated in each of the grants, a percentage of padding included with each of the grants, or any combinations thereof.

In some examples, the resource grant manager 740 may be configured as or otherwise support a means for estimating the downlink grant activity for one or more future time periods based on received downlink grants for a prior predetermined time period. In some examples, the channel parameter includes one or more of a signal to noise ratio (SNR), a channel quality indicator (CQI), a rank, a reference signal received power, or any combinations thereof. In some examples, the channel parameter includes a spectral efficiency estimate that is determined based on a channel state feedback measurement or a channel capacity calculation based on a correlation between a number of antenna ports and spectral efficiency. In some examples, the second set of downlink receive chains include fewer downlink receive chains than the first set of downlink receive chains, and is selected based on the downlink grant activity meeting a low activity threshold. In some examples, the second set of downlink receive chains include more downlink receive chains than the first set of downlink receive chains, and is selected based on the downlink grant activity meeting a high activity threshold. In some examples, the UE feedback associated with the second set of downlink receive chains is provided using channel state feedback (CSF) with a channel quality indication (CQI). In some examples, the UE feedback associated with the second set of downlink receive chains is provided using an SRS transmission for antenna switching.

Figure 8:
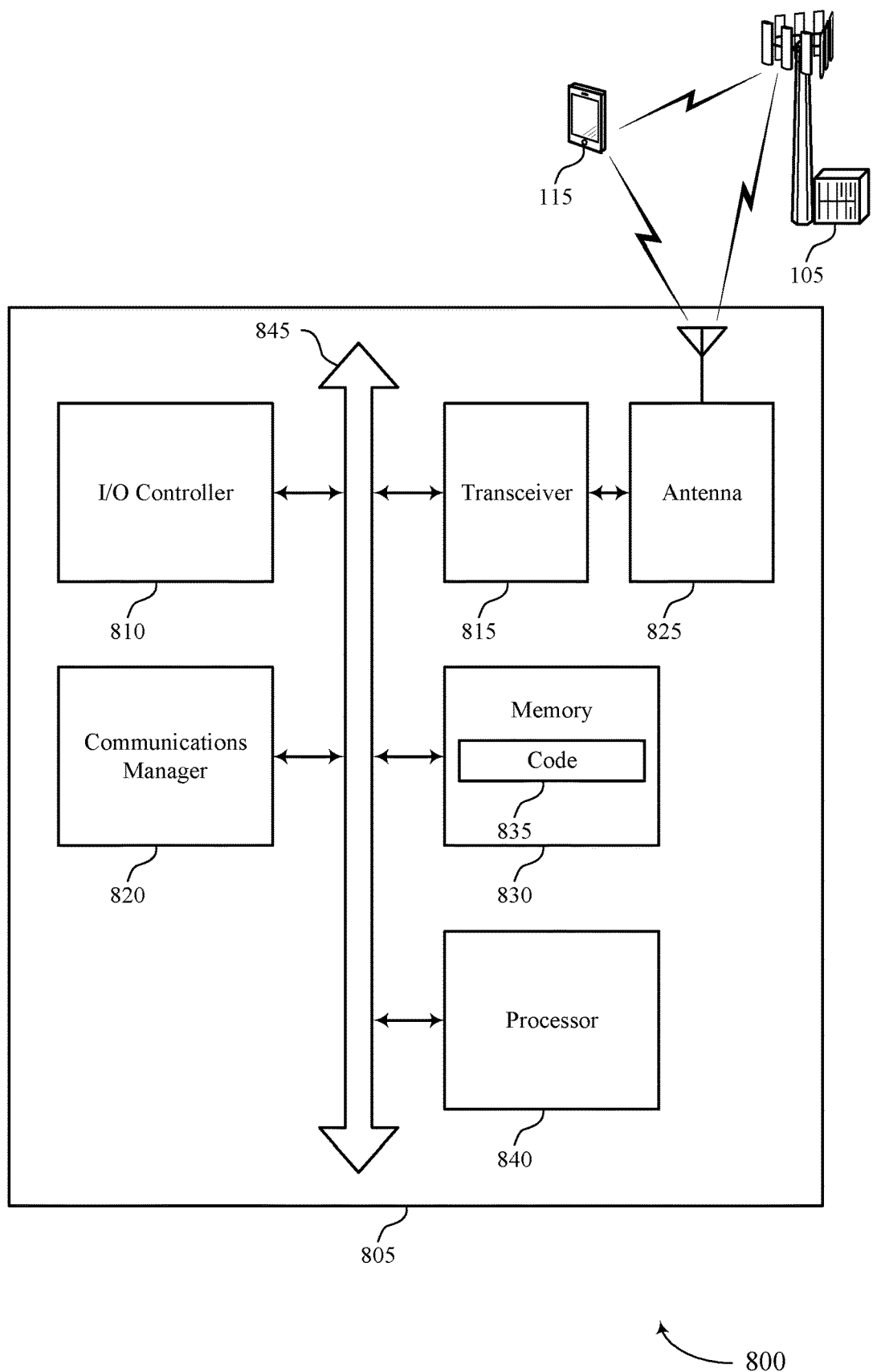
FIG. 8 shows a diagram of a system including a device that supports receive diversity techniques in wireless communications in accordance with aspects of the present disclosure.

FIG. 8 shows a diagram of a system 800 including a device 805 that supports receive diversity techniques in wireless communications in accordance with aspects of the present disclosure. The device 805 may be an example of or include the components of a device 505, a device 605, or a UE 115 as described herein. The device 805 may communicate wirelessly with one or more access network entities or base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting receive diversity techniques in wireless communications). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for communicating with an access network entity using a first set of downlink receive chains. The communications manager 820 may be configured as or otherwise support a means for switching to a second set of downlink receive chains based on a downlink grant activity, properties of one or more resource grants received from the access network entity, and one or more of a channel parameter or a network parameter used for communications between the UE and the access network entity. The communications manager 820 may be configured as or otherwise support a means for switching to the second set of downlink receiving chains after UE feedback corresponding to the second set of downlink receive chains is provided by the UE.

By including or configuring the communications manager 820 in accordance with examples as described herein, the device 805 may support techniques for adaptive adjustment of a number of active receive chains based on conditions at the UE. Such techniques may thus enhance UE efficiency and reduce power consumption, which may help to increase battery life.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of receive diversity techniques in wireless communications as described herein, or the processor 840 and the memory 830 may be otherwise configured to perform or support such operations.

Figure 9:
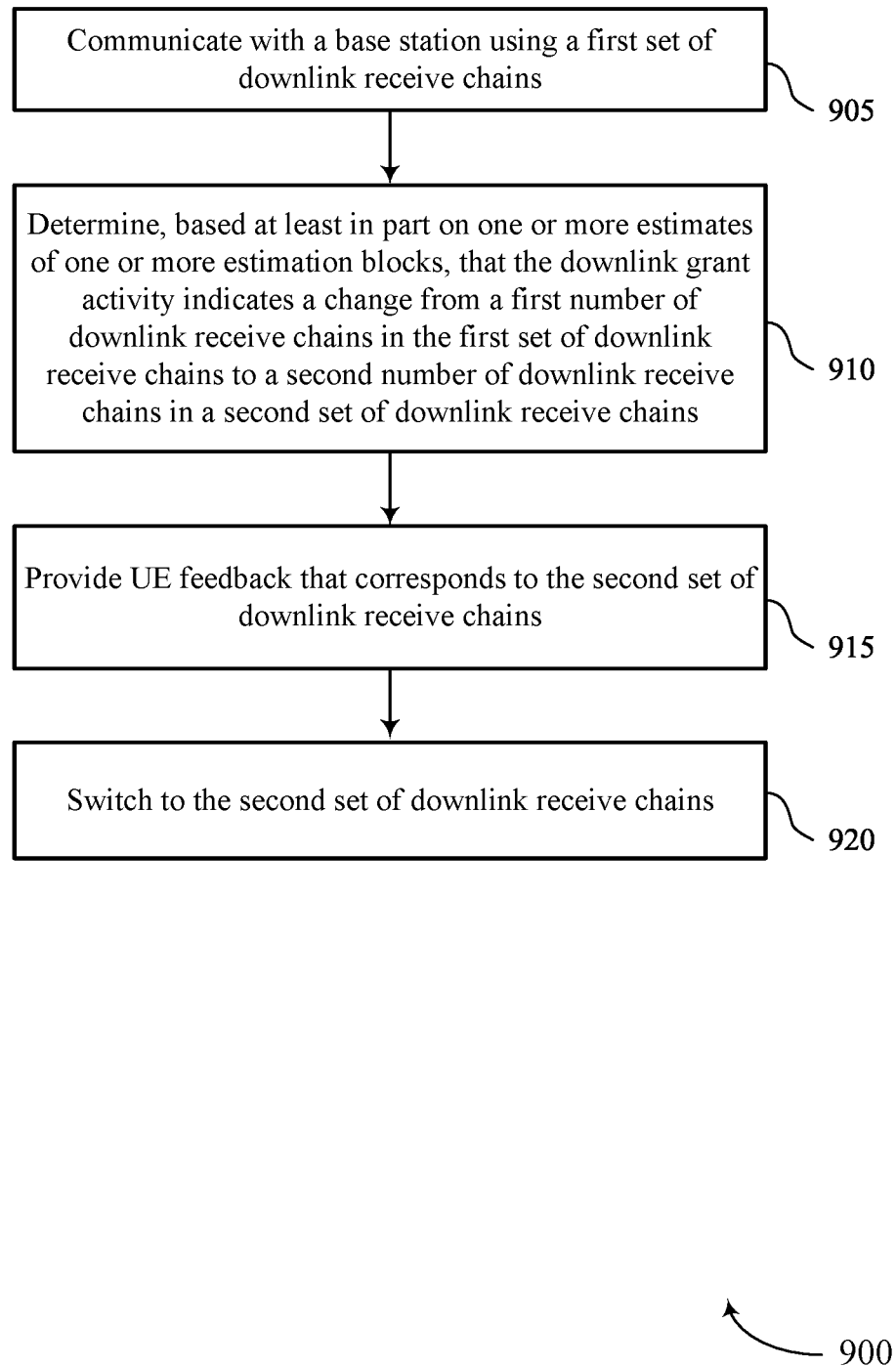
FIGS. 9 and 10 show flowcharts illustrating methods that support receive diversity techniques in wireless communications in accordance with aspects of the present disclosure.

FIG. 9 shows a flowchart illustrating a method 900 that supports receive diversity techniques in wireless communications in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include communicating with an access network entity using a first set of downlink receive chains. The operations of 905 may be performed in accordance with examples as disclosed herein. In some examples, aspects of the operations of 905 may be performed by a downlink resource manager 725 as described with reference to FIG. 7.

At 910, the method may include determining, based on one or more estimates of one or more estimation blocks, that the downlink grant activity indicates a change from a first number of downlink receive chains in the first set of downlink receive chains to a second number of downlink receive chains in a second set of downlink receive chains. The operations of 910 may be performed in accordance with examples as disclosed herein. In some examples, aspects of the operations of 910 may be performed by an estimation block manager 735 as described with reference to FIG. 7.

At 915, the method may include providing UE feedback that corresponds to the second set of downlink receive chains. The operations of 915 may be performed in accordance with examples as disclosed herein. In some examples, aspects of the operations of 915 may be performed by a UE feedback manager 755 as described with reference to FIG. 7.

At 920, the method may include the switching to the second set of downlink receive chains. The operations of 920 may be performed in accordance with examples as disclosed herein. In some examples, aspects of the operations of 920 may be performed by a receive chain manager 730 as described with reference to FIG. 7.

Figure 10:
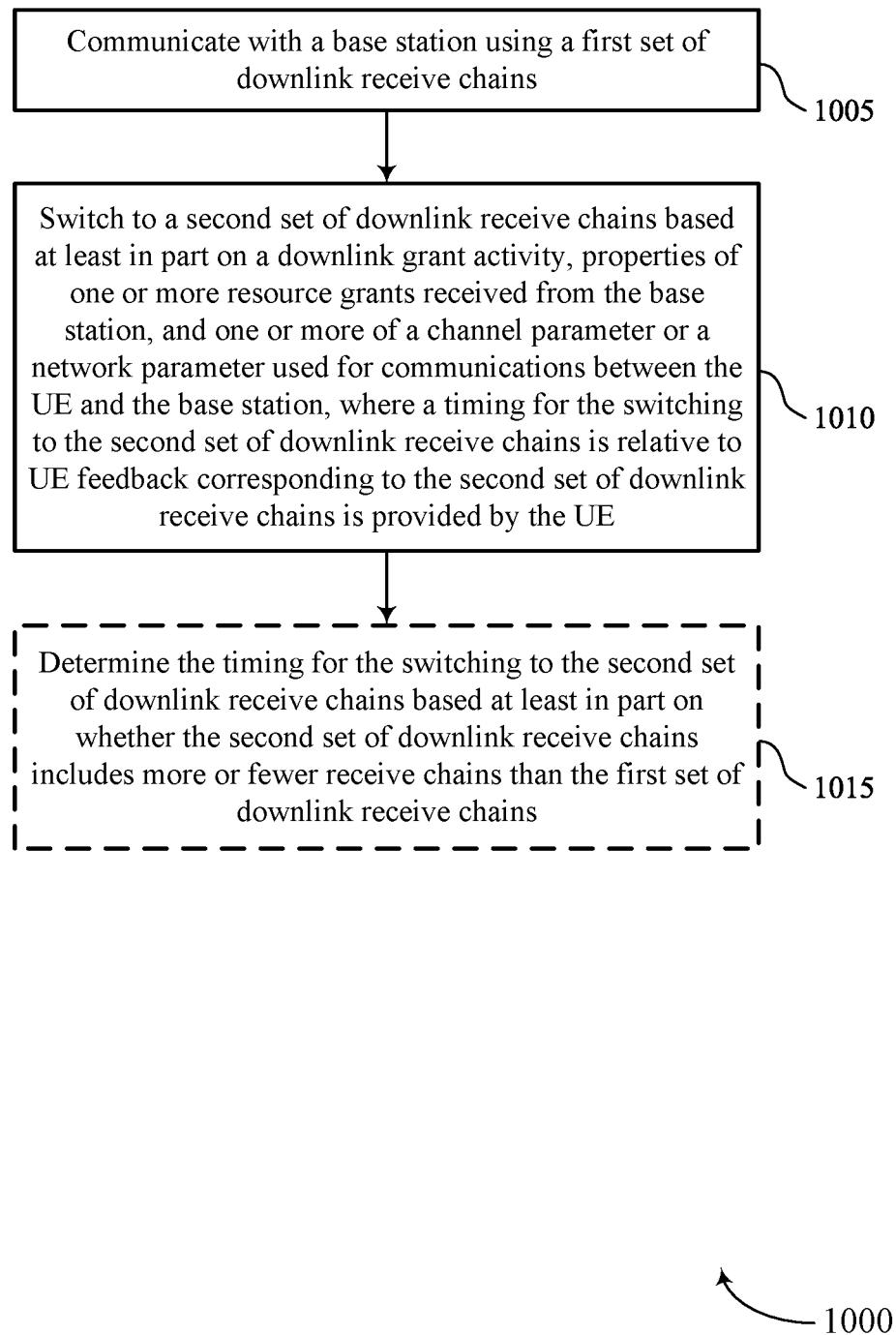

FIG. 10 shows a flowchart illustrating a method 1000 that supports receive diversity techniques in wireless communications in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include communicating with an access network entity using a first set of downlink receive chains. The operations of 1005 may be performed in accordance with examples as disclosed herein. In some examples, aspects of the operations of 1005 may be performed by a downlink resource manager 725 as described with reference to FIG. 7.

At 1010, the method may include switching to a second set of downlink receive chains based at least in part on a downlink grant activity, properties of one or more resource grants received from the access network entity, and one or more of a channel parameter or a network parameter used for communications between the UE and the access network entity, where a timing for the switching to the second set of downlink receive chains is relative to a UE feedback corresponding to the second set of downlink receive chains provided by the UE. The operations of 1010 may be performed in accordance with examples as disclosed herein. In some examples, aspects of the operations of 1010 may be performed by a receive chain manager 730 as described with reference to FIG. 7.

At 1015, the method may optionally include determining the timing for the switching to the second set of downlink receive chains based at least in part on whether the second set of downlink receive chains includes more or fewer receive chains than the first set of downlink receive chains. The operations of 1015 may be performed in accordance with examples as disclosed herein. In some examples, aspects of the operations of 1015 may be performed by a receive chain manager 730 as described with reference to FIG. 7.

The following provides an overview of aspects of the present disclosure:

Aspect 1: A method for wireless communication at a UE, comprising: communicating with an access network entity using a first set of downlink receive chains: and switching to a second set of downlink receive chains based at least in part on a downlink grant activity, properties of one or more resource grants received from the access network entity, and one or more of a channel parameter or a network parameter used for communications between the UE and the access network entity, and wherein a timing for the switching to the second set of downlink receive chains is relative to a UE feedback corresponding to the second set of downlink receive chains is provided by the UE.

Aspect 2: The method of aspect 1, further comprising: determining, based at least in part on one or more estimates of one or more estimation blocks, that the downlink grant activity indicates a change from a first number of downlink receive chains in the first set of downlink receive chains to a second number of downlink receive chains in the second set of downlink receive chains.

Aspect 3: The method of aspect 2, wherein the one or more estimation blocks include a high activity estimation block that indicates an increase in the first number of downlink receive chains is projected in order to support estimated downlink grants, and a low activity estimation block that indicates a decrease in the first number of downlink receive chains is projected in order to support the estimated downlink grants, and wherein the high activity estimation block and the low activity estimation block each estimate future downlink grants based at least in part on a number of downlink grants or downlink grant activity in an associated time window, and a high activity time window of the high activity estimation block is shorter than a low activity time window of the low activity estimation block.

Aspect 4: The method of any of aspects 1 through 3, further comprising: determining the timing for the switching to the second set of downlink receive chains based at least in part on whether the second set of downlink receive chains includes more or fewer receive chains than the first set of downlink receive chains.

Aspect 5: The method of aspect 4, wherein the timing for the switching to the second set of downlink receive chains is after a time window following providing the UE feedback, when the second set of downlink receive chains includes fewer receive chains than the first set of downlink receive chains, and the timing for the switching to the second set of downlink receive chains is independent of providing the UE feedback, when the second set of downlink receive chains includes more receive chains than the first set of downlink receive chains.

Aspect 6: The method of any of aspects 1 through 5, further comprising: determining whether to adjust a number of active downlink receive chains based at least in part on an amount of resource grants provided by the access network entity after the UE feedback is provided.

Aspect 7: The method of aspect 6, wherein the determining whether to adjust the number of active downlink receive chains comprises: determining that at least a threshold number of resource grants allocate more transmission layers than the number of active downlink receive chains of the second set of downlink receive chains: and increasing the number of active downlink receive chains of the second set of downlink receive chains.

Aspect 8: The method of any of aspects 1 through 7, wherein the downlink grant activity is based at least in part on a quantity of downlink grants received from the access network entity that have at least a threshold amount of data that is to be transmitted.

Aspect 9: The method of any of aspects 1 through 8, wherein the channel parameter includes a spectral efficiency parameter that is estimated for each of the first set of downlink receive chains and the second set of downlink receive chains, and wherein the switching to the second set of downlink receive chains is responsive to a second spectral efficiency estimate of the second set of downlink receive chains being within a threshold value of a first spectral efficiency estimate of the first set of downlink receive chains.

Aspect 10: The method of any of aspects 1 through 9, wherein the network parameter used for communications between the UE and the access network entity includes a grant arrival uniformity that indicates a scheduling rate of grants from the access network entity, and wherein a scheduling rate below a scheduling rate threshold is associated with a lower data threshold for counting a grant in the downlink grant activity, and the scheduling rate at or above the scheduling rate threshold is associated with a higher data threshold for counting the grant in the downlink grant activity.

Aspect 11: The method of any of aspects 1 through 10, wherein the network parameter used for communications between the UE and the access network entity includes one or more grant arrival patterns that indicate a scheduling rate of grants from the access network entity, and wherein a scheduling rate below a scheduling rate threshold is associated with a lower data threshold for counting a grant in the downlink grant activity, and the scheduling rate at or above the scheduling rate threshold is associated with a higher data threshold for counting the grant in the downlink grant activity.

Aspect 12: The method of any of aspects 1 through 11, wherein the downlink grant activity includes one or more of a number of grants, an average size of grants, an intra-arrival time of grants, a uniformity in time of grant arrival, a number of recourse blocks allocated in each of the grants, a percentage of padding included with each of the grants, or any combinations thereof.

Aspect 13: The method of any of aspects 1 through 12, further comprising: estimating the downlink grant activity for one or more future time periods based at least in part on received downlink grants for a prior predetermined time period.

Aspect 14: The method of any of aspects 1 through 13, wherein the channel parameter includes one or more of a signal to noise ratio (SNR), a channel quality indicator (CQI), a rank, a reference signal received power, or any combinations thereof.

Aspect 15: The method of any of aspects 1 through 14, wherein the channel parameter includes a spectral efficiency estimate that is determined based at least in part on a channel state feedback measurement or a channel capacity calculation based on a correlation between a number of antenna ports and spectral efficiency.

Aspect 16: The method of any of aspects 1 through 15, wherein the second set of downlink receive chains include fewer downlink receive chains than the first set of downlink receive chains, and is selected based at least in part on the downlink grant activity meeting a low activity threshold.

Aspect 17: The method of any of aspects 1 through 15, wherein the second set of downlink receive chains include more downlink receive chains than the first set of downlink receive chains, and is selected based at least in part on the downlink grant activity meeting a high activity threshold.

Aspect 18: The method of any of aspects 1 through 17, wherein the UE feedback associated with the second set of downlink receive chains is provided using channel state feedback (CSF) with a channel quality indication (CQI).

Aspect 19: The method of any of aspects 1 through 18, wherein the UE feedback associated with the second set of downlink receive chains is provided using an SRS transmission for antenna switching.

Aspect 20: An apparatus for wireless communication at a UE, comprising a processor: memory coupled with the processor: and instructions stored in the memory and executable by the processor to cause the apparatus to perform a method of any of aspects 1 through 19.

Aspect 21: An apparatus for wireless communication at a UE, comprising at least one means for performing a method of any of aspects 1 through 19.

Aspect 22: A non-transitory computer-readable medium storing code for wireless communication at a UE, the code comprising instructions executable by a processor to perform a method of any of aspects 1 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like.

Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   communicating with an access network entity using a first set of downlink receive chains; and
   switching to a second set of downlink receive chains based at least in part on a downlink grant activity, properties of one or more resource grants received from the access network entity, and one or more of a channel parameter or a network parameter used for communications between the UE and the access network entity, and wherein
   a timing for the switching to the second set of downlink receive chains is relative to a UE feedback corresponding to the second set of downlink receive chains that is provided by the UE, and the timing for the switching to the second set of downlink receive chains is different based on whether the second set of downlink receive chains includes more or fewer receive chains than the first set of downlink receive chains.

2. The method of claim 1, further comprising:
   determining, based at least in part on one or more estimates of one or more estimation blocks, that the downlink grant activity indicates a change from a first number of downlink receive chains in the first set of downlink receive chains to a second number of downlink receive chains in the second set of downlink receive chains.

3. The method of claim 2, wherein the one or more estimation blocks include:
   a high activity estimation block that indicates an increase in the first number of downlink receive chains is projected in order to support estimated downlink grants, and
   a low activity estimation block that indicates a decrease in the first number of downlink receive chains is projected in order to support the estimated downlink grants, and
   wherein the high activity estimation block and the low activity estimation block each estimate future downlink grants based at least in part on a number of downlink grants or downlink grant activity in an associated time window, and a high activity time window of the high activity estimation block is shorter than a low activity time window of the low activity estimation block.

4. The method of claim 1, further comprising:
   determining the timing for the switching to the second set of downlink receive chains based at least in part on whether the second set of downlink receive chains includes more or fewer receive chains than the first set of downlink receive chains.

5. The method of claim 4, wherein:
   the timing for the switching to the second set of downlink receive chains is after a time window following providing the UE feedback, when the second set of downlink receive chains includes fewer receive chains than the first set of downlink receive chains, and
   the timing for the switching to the second set of downlink receive chains is independent of the UE feedback, when the second set of downlink receive chains includes more receive chains than the first set of downlink receive chains.

6. The method of claim 1, further comprising:
   determining whether to adjust a number of active downlink receive chains based at least in part on an amount of resource grants provided by the access network entity after the UE feedback is provided.

7. The method of claim 6, wherein the determining whether to adjust the number of active downlink receive chains comprises:
   determining that at least a threshold number of resource grants allocate more transmission layers than the number of active downlink receive chains of the second set of downlink receive chains; and
   increasing the number of active downlink receive chains of the second set of downlink receive chains.

8. The method of claim 1, wherein the downlink grant activity is based at least in part on a quantity of downlink grants received from the access network entity that have at least a threshold amount of data that is to be transmitted.

9. The method of claim 1, wherein the channel parameter includes a spectral efficiency parameter that is estimated for each of the first set of downlink receive chains and the second set of downlink receive chains, and wherein the switching to the second set of downlink receive chains is responsive to a second spectral efficiency estimate of the second set of downlink receive chains being within a threshold value of a first spectral efficiency estimate of the first set of downlink receive chains.

10. The method of claim 1, wherein the network parameter used for communications between the UE and the access network entity includes a grant arrival uniformity that indicates a scheduling rate of grants from the access network entity, and wherein a scheduling rate below a scheduling rate threshold is associated with a lower data threshold for counting a grant in the downlink grant activity, and the scheduling rate at or above the scheduling rate threshold is associated with a higher data threshold for counting the grant in the downlink grant activity.

11. The method of claim 1, wherein the network parameter used for communications between the UE and the access network entity includes one or more grant arrival patterns that indicate a scheduling rate of grants from the access network entity, and wherein a scheduling rate below a scheduling rate threshold is associated with a lower data threshold for counting a grant in the downlink grant activity, and the scheduling rate at or above the scheduling rate threshold is associated with a higher data threshold for counting the grant in the downlink grant activity.

12. The method of claim 1, wherein the downlink grant activity includes one or more of a number of grants, an average size of grants, an intra-arrival time of grants, a uniformity in time of grant arrival, a number of recourse blocks allocated in each of the grants, a percentage of padding included with each of the grants, or any combinations thereof.

13. The method of claim 1, further comprising:
estimating the downlink grant activity for one or more future time periods based at least in part on received downlink grants for a prior predetermined time period.

14. The method of claim 1, wherein the channel parameter includes one or more of a signal to noise ratio (SNR), a channel quality indicator (CQI), a rank, a reference signal received power, or any combinations thereof.

15. The method of claim 1, wherein the channel parameter includes a spectral efficiency estimate that is determined based at least in part on a channel state feedback measurement or a channel capacity calculation based on a correlation between a number of antenna ports and spectral efficiency.

16. The method of claim 1, wherein the second set of downlink receive chains include fewer downlink receive chains than the first set of downlink receive chains, and is selected based at least in part on the downlink grant activity meeting a low activity threshold.

17. The method of claim 1, wherein the second set of downlink receive chains include more downlink receive chains than the first set of downlink receive chains, and is selected based at least in part on the downlink grant activity meeting a high activity threshold.

18. The method of claim 1, wherein the UE feedback associated with the second set of downlink receive chains is provided using channel state feedback (CSF) with a channel quality indication (CQI).

19. The method of claim 1, wherein the UE feedback associated with the second set of downlink receive chains is provided using a sounding reference signal (SRS) transmission for antenna switching.

20. An apparatus for wireless communication at a user equipment (UE), comprising:
a processor;
memory coupled with the processor; and
instructions stored in the memory and executable by the processor to cause the apparatus to:
communicate with an access network entity using a first set of downlink receive chains; and
switch to a second set of downlink receive chains based at least in part on a downlink grant activity, properties of one or more resource grants received from the access network entity, and one or more of a channel parameter or a network parameter used for communications between the UE and the access network entity, and wherein
a timing for the switching to the second set of downlink receive chains is relative to a UE feedback corresponding to the second set of downlink receive chains that is provided by the UE, and the timing for the switching to the second set of downlink receive chains is different based on whether the second set of downlink receive chains includes more or fewer receive chains than the first set of downlink receive chains.

21. The apparatus of claim 20, wherein the instructions are further executable by the processor to cause the apparatus to:
determine, based at least in part on one or more estimates of one or more estimation blocks, that the downlink grant activity indicates a change from a first number of downlink receive chains in the first set of downlink receive chains to a second number of downlink receive chains in the second set of downlink receive chains.

22. The apparatus of claim 21, wherein the one or more estimation blocks include:
a high activity estimation block that indicates an increase in the first number of downlink receive chains is projected in order to support estimated downlink grants, and
a low activity estimation block that indicates a decrease in the first number of downlink receive chains is projected in order to support the estimated downlink grants, and
wherein the high activity estimation block and the low activity estimation block each estimate future downlink grants based at least in part on a number of downlink grants or downlink grant activity in an associated time window, and a high activity time window of the high activity estimation block is shorter than a low activity time window of the low activity estimation block.

23. The apparatus of claim 20, wherein the instructions are further executable by the processor to cause the apparatus to:
determine the timing for the switching to the second set of downlink receive chains based at least in part on whether the second set of downlink receive chains includes more or fewer receive chains than the first set of downlink receive chains.

24. The apparatus of claim 23, wherein:
the timing for the switching to the second set of downlink receive chains is after a time window following providing the UE feedback, when the second set of downlink receive chains includes fewer receive chains than the first set of downlink receive chains, and
the timing for the switching to the second set of downlink receive chains is independent of the UE feedback, when the second set of downlink receive chains includes more receive chains than the first set of downlink receive chains.

25. An apparatus for wireless communication at a user equipment (UE), comprising:
means for communicating with an access network entity using a first set of downlink receive chains; and
means for switching to a second set of downlink receive chains based at least in part on a downlink grant activity, properties of one or more resource grants received from the access network entity, and one or more of a channel parameter or a network parameter used for communications between the UE and the access network entity, and wherein
a timing for the switching to the second set of downlink receive chains is relative to a UE feedback corresponding to the second set of downlink receive chains that is provided by the UE, and the timing for the switching to the second set of downlink receive chains is different based on whether the second set of downlink receive chains includes more or fewer receive chains than the first set of downlink receive chains.

26. The apparatus of claim 25, further comprising:
means for determining, based at least in part on one or more estimates of one or more estimation blocks, that the downlink grant activity indicates a change from a first number of downlink receive chains in the first set of downlink receive chains to a second number of downlink receive chains in the second set of downlink receive chains.

27. The apparatus of claim 26, wherein the one or more estimation blocks include:
a high activity estimation block that indicates an increase in the first number of downlink receive chains is projected in order to support estimated downlink grants, and
a low activity estimation block that indicates a decrease in the first number of downlink receive chains is projected in order to support the estimated downlink grants, and
wherein the high activity estimation block and the low activity estimation block each estimate future downlink grants based at least in part on a number of downlink grants or downlink grant activity in an associated time window, and a high activity time window of the high activity estimation block is shorter than a low activity time window of the low activity estimation block.

28. The apparatus of claim 25, further comprising:
means for determining the timing for the switching to the second set of downlink receive chains based at least in part on whether the second set of downlink receive chains includes more or fewer receive chains than the first set of downlink receive chains.

29. The apparatus of claim 25, further comprising:
means for determining whether to adjust a number of active downlink receive chains based at least in part on an amount of resource grants provided by the access network entity after the UE feedback is provided.

30. A non-transitory computer-readable medium storing code for wireless communications at a user equipment (UE), the code comprising instructions executable by a processor to:
communicate with an access network entity using a first set of downlink receive chains; and
switch to a second set of downlink receive chains based at least in part on a downlink grant activity, properties of one or more resource grants received from the access network entity, and one or more of a channel parameter or a network parameter used for communications between the UE and the access network entity, and wherein
a timing for the switching to the second set of downlink receive chains is relative to a UE feedback corresponding to the second set of downlink receive chains that is provided by the UE, and the timing for the switching to the second set of downlink receive chains is different based on whether the second set of downlink receive chains includes more or fewer receive chains than the first set of downlink receive chains.

* * * * *